United States Patent [19]
Ishida et al.

[11] Patent Number: 5,749,173
[45] Date of Patent: May 12, 1998

[54] POWER WINDOW REGULATOR APPARATUS

[75] Inventors: Toshihiko Ishida, Anjyo; Toshimitsu Oka, Okazaki; Naofumi Fujie, Nagoya; Hitoshi Ishikawa, Nishio; Yasuaki Suzuki, Kariya, all of Japan

[73] Assignee: Aisin Seiki Kabushiki Kaisha, Japan

[21] Appl. No.: 803,244

[22] Filed: Feb. 20, 1997

[30] Foreign Application Priority Data

Feb. 29, 1996 [JP] Japan .................. 8-067513

[51] Int. Cl.⁶ .................................. E05F 15/08
[52] U.S. Cl. .................................. 49/349
[58] Field of Search .............. 49/348, 349, 26, 49/27, 28

[56] References Cited

U.S. PATENT DOCUMENTS

| | | | |
|---|---|---|---|
| 4,267,668 | 5/1981 | Natinsky | 49/349 |
| 4,908,988 | 3/1990 | Yamamura et al. | 49/349 X |
| 5,351,439 | 10/1994 | Takeda et al. | 49/349 X |
| 5,404,673 | 4/1995 | Takeda et al. | 49/349 X |
| 5,572,101 | 11/1996 | Rutkowski et al. | 49/349 X |

FOREIGN PATENT DOCUMENTS

| | | |
|---|---|---|
| 62-69580 | 5/1987 | Japan . |
| 7-18864 | 5/1995 | Japan . |
| 8-29114 | 2/1996 | Japan . |

*Primary Examiner*—Jerry Redman
*Attorney, Agent, or Firm*—Finnegan, Henderson, Farabow, Garrett & Dunner, L.L.P.

[57] ABSTRACT

A regulator for a power window having a safety function for preventing an object from being caught in a closing power window includes a driving unit for raising and lowering the window glass of a vehicle and a driven unit which receives power from the driving unit. When frictional resistance corresponding to relative displacement between the driving and driven units is less than a fixed value during descent of the window glass and exceeds this fixed during ascent of the window glass, the ascending window glass is reversed and made to descend. When the amount of an increase in current to the driving unit during ascent of the window glass increases in a case where the sliding resistance has exceeded a fixed value even once during descent of the window glass, the ascending window glass is reversed and made to descend.

12 Claims, 6 Drawing Sheets

5,749,173

POWER WINDOW REGULATOR APPARATUS

BACKGROUND OF THE INVENTION

This invention relates to a power window regulator apparatus for raising and lowering a window glass by an electrical power. More particularly, the invention relates to a power window regulator apparatus incorporating a safety function for preventing one's hand, articles or other obstacles from being caught in a closing power window.

DESCRIPTION OF THE PRIOR ART

There is a variety of types of power windows. In one type, which relies upon a cable, power from an electric motor is used to raise and lower a window glass along guide rails on both sides of a door frame by means of a cable. In another type, the electric motor is used to raise and lower the window glass by crossed arms in the form of X configuration. In either case, a window regulator apparatus incorporating an electric motor as the power source is used.

If one's hand or an article becomes caught between the window glass and the door frame when the window glass is raised, it is necessary to sense this, halt the raising of the window glass and then immediately reverse its direction so that the window glass will be forced to be lowered. In order to satisfy this need, window regulators for power windows are provided with a safety function for preventing obstructions from being caught in the closing power window.

The power window regulator apparatus equipped with such a safety function is disclosed in the specification of Japanese Utility Model Publication (KOKOKU) No. 7-18864, by way of an example. According to this disclosure, the rotational torque of a rotary body located on the input side and rotated by an electric motor is transmitted to a rotary body on the output side via a coil spring, and the rotational torque that has been transferred to this rotary body on the output side actuates the cable or crossed arms as mentioned above. If the person's hand or the article becomes caught between the window glass and the door frame, the speed at which the window glass rises slows as a result. Since this causes the rotary body on the output side to slow down, relative rotation inevitably develops between the input rotary body rotating at a constant speed and the output rotary body the speed whereof has decreased. According to the art described in the aforementioned Japanese Utility Model Publication (KOKOKU) No. 7-18864, this relative rotation is sensed immediately (this is actually detected by moving a contactor so as to contact a contact member) and a signal indicative of this fact is supplied to a controller.

In the example of the prior art described above, no consideration is given to a change in sliding resistance conforming to a change in the temperature of the door frame molding or of the edges of the window glass or to the number of years of use. Consequently, an increase in sliding resistance due to a simple change in atmospheric temperature may be detected erroneously as obstacle blockage of the window, thereby causing the window glass to be lowered when this is not necessary.

SUMMARY OF THE INVENTION

Accordingly, an object of the present invention is to provide a power window regulator apparatus that solves this problem encountered in the prior art.

Another object of the present invention is provided to a power window regulator apparatus in which when a sliding resistance is increased once over a predetermined level during the lowering of a window glass, the raising window glass is reversely lowered immediately after if an amount of an electrical current flow supplied to a driving member is increased over a predetermined level during the raising of the window glass.

According to the present invention, the foregoing object is attained by providing a power window regulator apparatus comprising a worm rotated by an electric motor, a driving element having a worm wheel for meshing with the worm, a driven element connected to the driving element via a ring spring, an output shaft connected to the driven element, a printed circuit board synchronized to the output shaft and provided with a first switch for sensing resistance when displacement of the ring spring at descent of the window glass departs from a fixed region and a second switch for sensing resistance when displacement of the ring spring at ascent of the window glass departs from a fixed region, and a controller for receiving a signal from the first switch at descent of the window glass and sensing an amount of current increase to the electric motor, the window glass being lowered in response to a signal from the second switch or controller.

In another aspect, the foregoing object is attained by providing a power window regulator comprising a power unit for raising or lowering a window glass of a vehicle, and a controller for commanding the power unit to raise or lower the window glass, the controller having a movement decision unit for judging whether the window glass is being lowered or raised, a position decision unit for judging whether the window glass is situated in an area in which obstacle blockage of the window glass is measured or in an area in which sliding resistance is detected at descent of the window glass, a resistance decision unit for judging a value of resistance measured during descent and ascent of the window glass, and a current measurement unit for measuring amount of current increase to the power unit in dependence upon a signal from the resistance decision unit.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
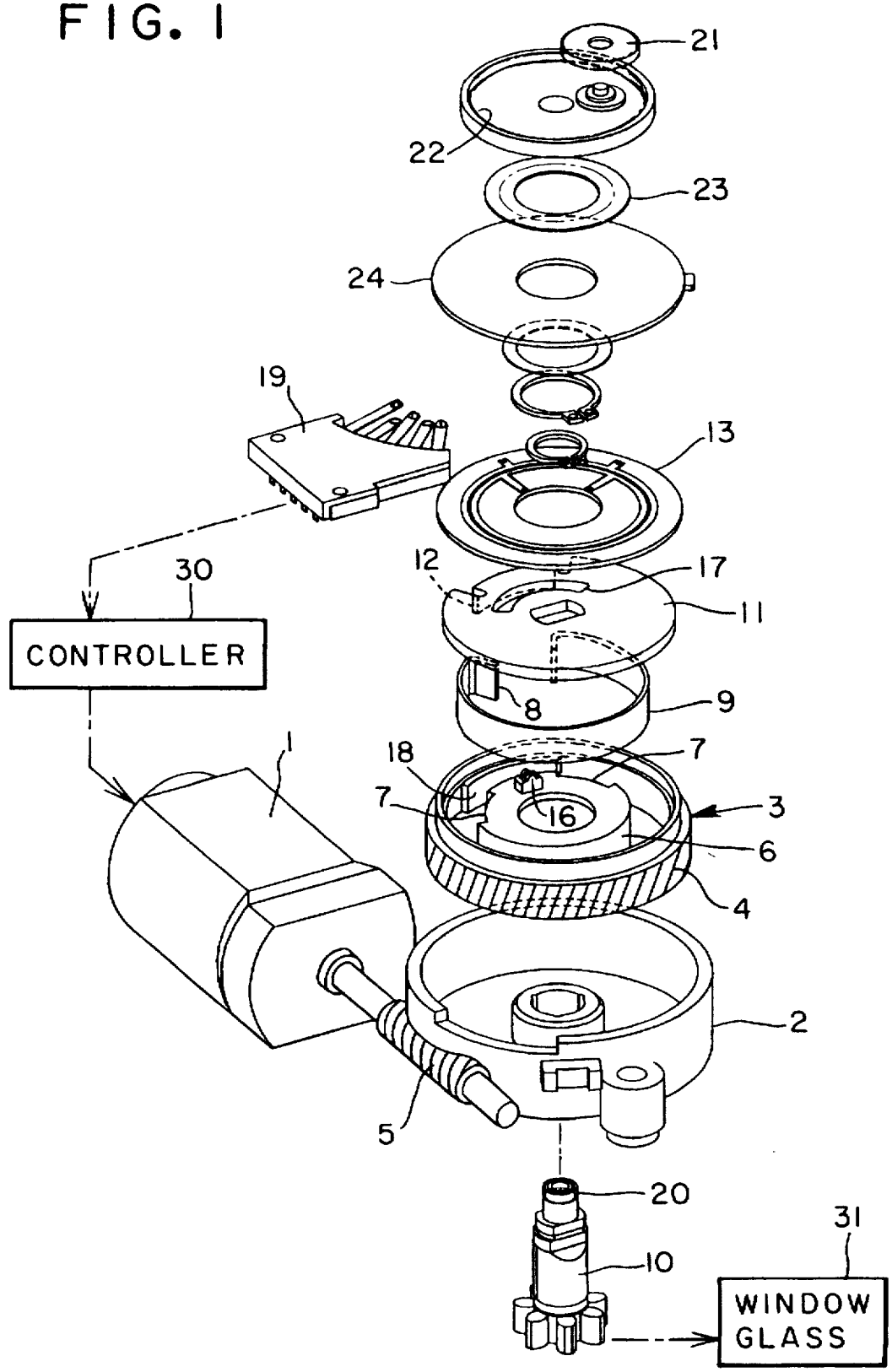
FIG. 1 is an exploded perspective view illustrating a power window regulator embodying the present invention.
Figure 2:
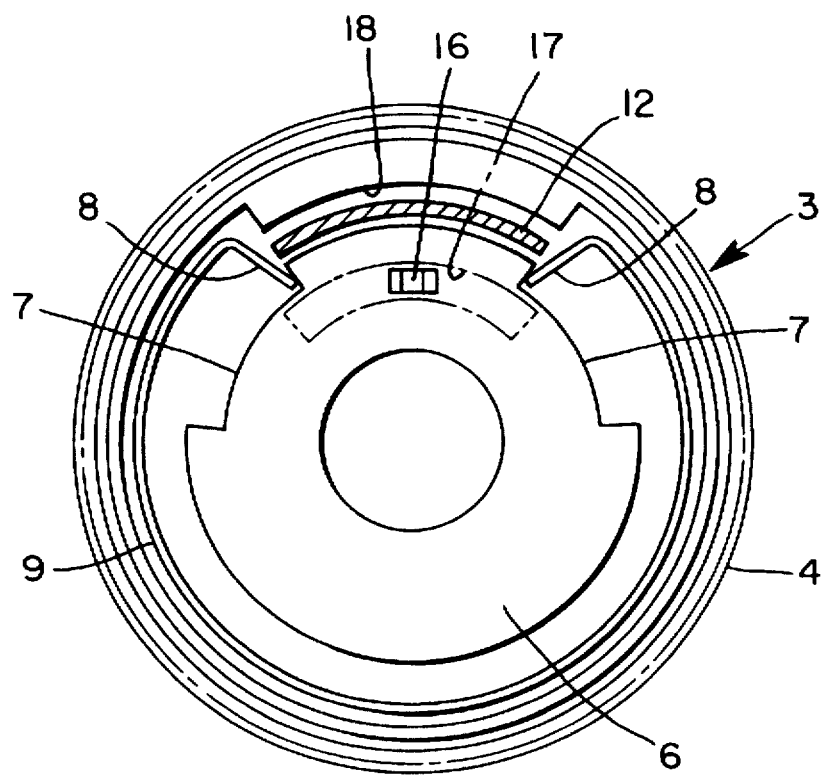
FIG. 2 is a plan view of a driving element.
Figure 3:
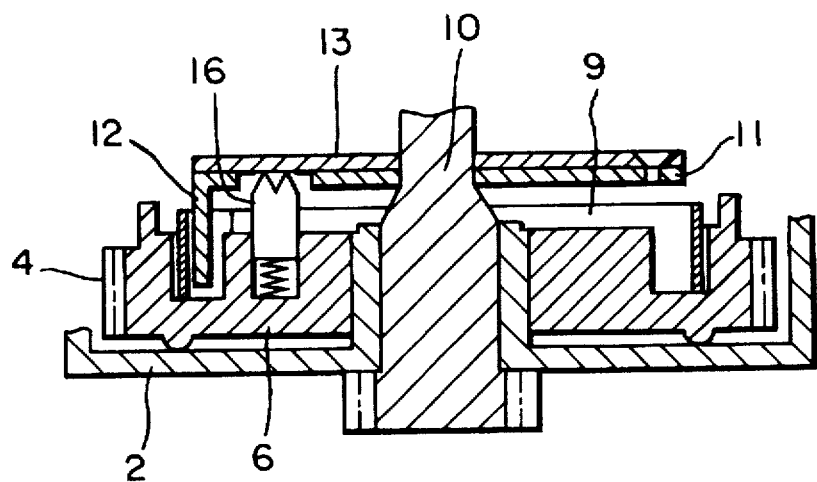
FIG. 3 is a sectional view of the driving element.

A preferred embodiment of a power window regulator apparatus according to the present invention will now be described with reference to FIG. 1. The apparatus includes a cylindrical housing 2 equipped with an electric motor 1, and a circular driving element 3 accommodated in the housing 2 so as to be free to rotate. A worm wheel 4 provided on the outer circumferential surface of the driving element 3 is meshed with a worm 5 on an output shaft of the electric motor 1. The driving element 3 has a centrally located boss 6 the outer circumferential surface of which is provided with a pair of spaced grooves 7 (see FIG. 2). A ring spring 9 having butt end faces 8 is placed between the inner circumferential wall of the driving element 3 and the outer circumferential wall of the boss 6 in such a manner that the end faces 8 are situated in the grooves 7.

An output shaft 10 is passed through the housing 2 and the boss 6. The output shaft 10 is connected to a cable in a cable-type mechanism (not shown) for raising and lowering a window glass 31 or to a driven gear in a cross-arm-type mechanism (not shown) for raising and lowering the window glass 31. The output shaft 10 supports a driven element 11, which comprises a tension plate, in such a manner that the driven element 11 opposes the ring spring 9. The output shaft 10 and driven element 11 co-rotate. The driven element 11 has a downwardly directed pawl 12 situated between the end faces 8 of the ring spring 9.

When the electric motor 1 is rotated in one direction for the purpose of raising or lowering the window glass 31, the worm 5 rotates the worm wheel 4. As a result, an inner circumferential projection 18 on the driving element 3 constituting an integral part of the worm wheel 4 contacts one of the end faces 8 of the ring spring 9, the end face 8 and the pawl 12 engage and the driven element 11 rotates. The rotation of the driven element 11 causes the output shaft 10 to rotate in identical fashion, thereby raising or lowering the window glass 31.

If one's hand or an article becomes caught between the window glass 31 and the door frame to apply a load to the window glass during the raising of the window glass, the load causes the pawl 12 of the driven element 11 to press against one end face 8 until relative rotation develops between the driving element 3 and the driven element 11.

Figure 4:
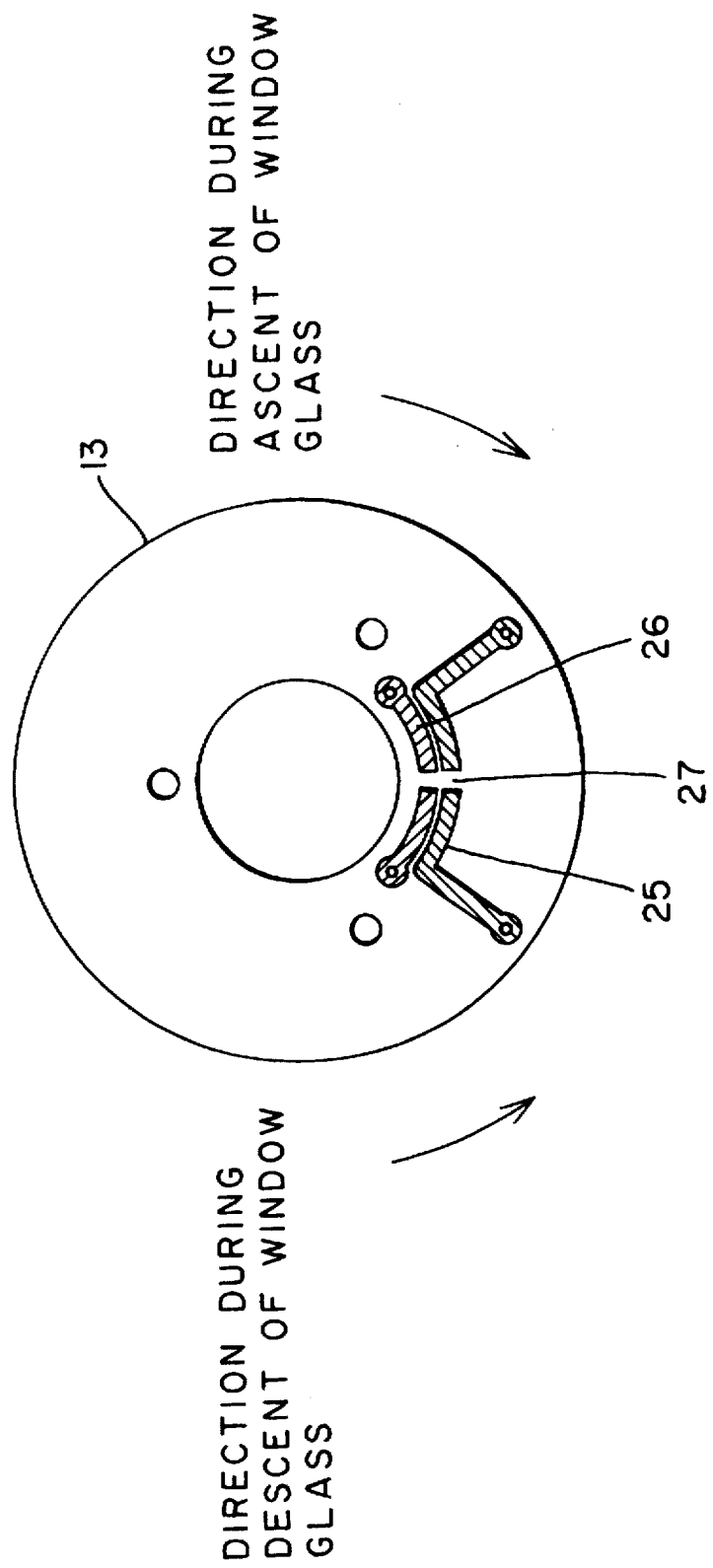
FIG. 4 is a plan view illustrating an example of a printed circuit on a printed circuit board.

This relative rotation is sensed by a printed circuit board 13 fixed to the output shaft 10 or driven element 11. As shown in FIG. 4, the printed circuit board 13 has a first switch 25 comprising a pair of spaced, arcuate printed circuits, a second switch 26 comprising a pair of spaced, arcuate printed circuits that are spaced away from the first switch 25 in the circumferential direction, and a non-switch portion 27 located between the switches 25 and 26. Signals from the switches 25 and 26 are capable of being entered into a controller 30 through a terminal device 19 from the side of the board opposite the switches 25, 26.

A shoe 16 which slides freely on the printed circuit board 13 via an arcuate hole 17 in the driven element 11 is disposed on the center boss 6 of the driving element 3. Under the biasing force of a spring 29, the shoe 16 of an electrical conductive material is in constant siding contact with either the first switch 25, the second switch 26 or the non-switch portion 27.

Since the relative movement between the driving element 3 and driven element 11 is small during ordinary ascent or descent of the window glass, the shoe 16 is situated at the location of the non-switch 27 and there is no electrical input signal to the terminal device 19. If, under these conditions, the shoe 16 contacts the second switch 26 during ascent of the window glass so that a signal indicative of the fact that the second switch 26 has been closed enters the terminal device 19, the controller 30 senses obstacle blockage of the window glass and responds by immediately lowering the window glass.

When the temperature is low, as during winter, the sliding resistance of the window glass during ordinary descent thereof is high. Consequently, there are occasions where the shoe 16 contacts the first switch 25 and a signal indicative of the fact that first switch 25 has been closed enters the terminal device 19. When the window glass is raised in this case, a high sliding resistance is met and the second switch 26 is closed regardless of the fact that nothing has become caught in the power window. This means that the rising window glass is caused to change direction and descends as a result. Accordingly, in the illustrated embodiment of the invention, means are provided whereby when a signal from the first switch 25 is received during the lowering of the window glass, a signal from the second switch 26, which is for sensing obstacle blockage of the window glass during the ascent thereof, is canceled, and the accident is sensed by measuring the rate of increase in the amount of current fed into the electric motor 1.

A mechanism for detecting the position of the window glass will now be described. A gear 20 at the distal end of the output shaft 10 is coupled to a reduction gear mechanism having at least an intermediate gear 21 and an internal gear 22, and the reduction gear mechanism is coupled to a position detecting plate 24 via a friction plate 23. In accordance with this mechanism, six revolutions of the output shaft 10 can be converted to one revolution of the position detecting plate 24, by way of example. The position detecting plate 24 has a printed circuit (not shown) that is electrically connected to the terminal device 19 so that a signal representing angle of rotation (which corresponds to a signal indicating the position of the window glass) of the plate 24 may be sent to the externally located controller. The controller controls the amount and direction of rotation of the electric motor 1 in dependence upon the position signal in such a manner that the window glass can be lowered to a predetermined position.

Figure 6:
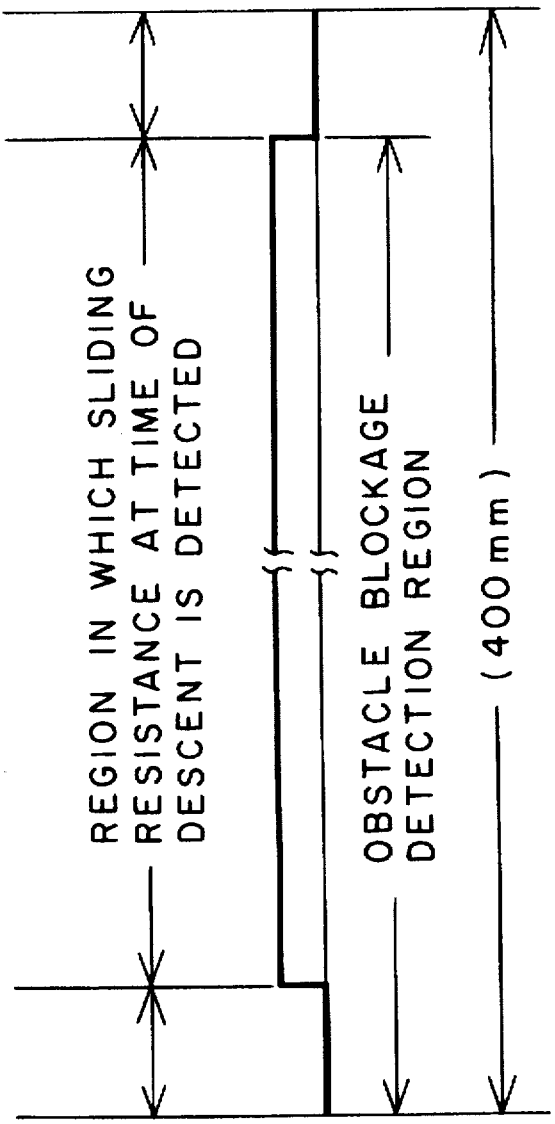
FIG. 6 is a diagram illustrating an area in which obstacle blockage of a closing window glass is detected.

If an object such as ones's hand or an article becomes caught between the window glass and the door frame during the ascent of the window glass; the load applied to the rising window glass due to such obstacle blockage is sensed by measuring the increase in sliding resistance offered during the ascent of the window glass. The second switch 26 is closed when the window glass reaches a top dead point and the first switch 25 is closed when the window glass reaches a bottom dead point. Accordingly, as shown in FIG. 6, since the window glass is closed in a region in the vicinity of the top dead point, detection of obstacle blockage is not carried out in this region. A region from which this region is excluded, therefore, is adopted as an obstacle blockage detection region. Further, sliding resistance at the time of descent cannot be detected in a region in the vicinity of the bottom dead point. Accordingly, a region obtained by excluding this region from the obstacle blockage detection region is adopted as a region in which sliding resistance at descent is detected.

The operation for detecting that an object has become caught in the power window will now be described with reference to the flowchart of FIG. 5.

Figure 5:
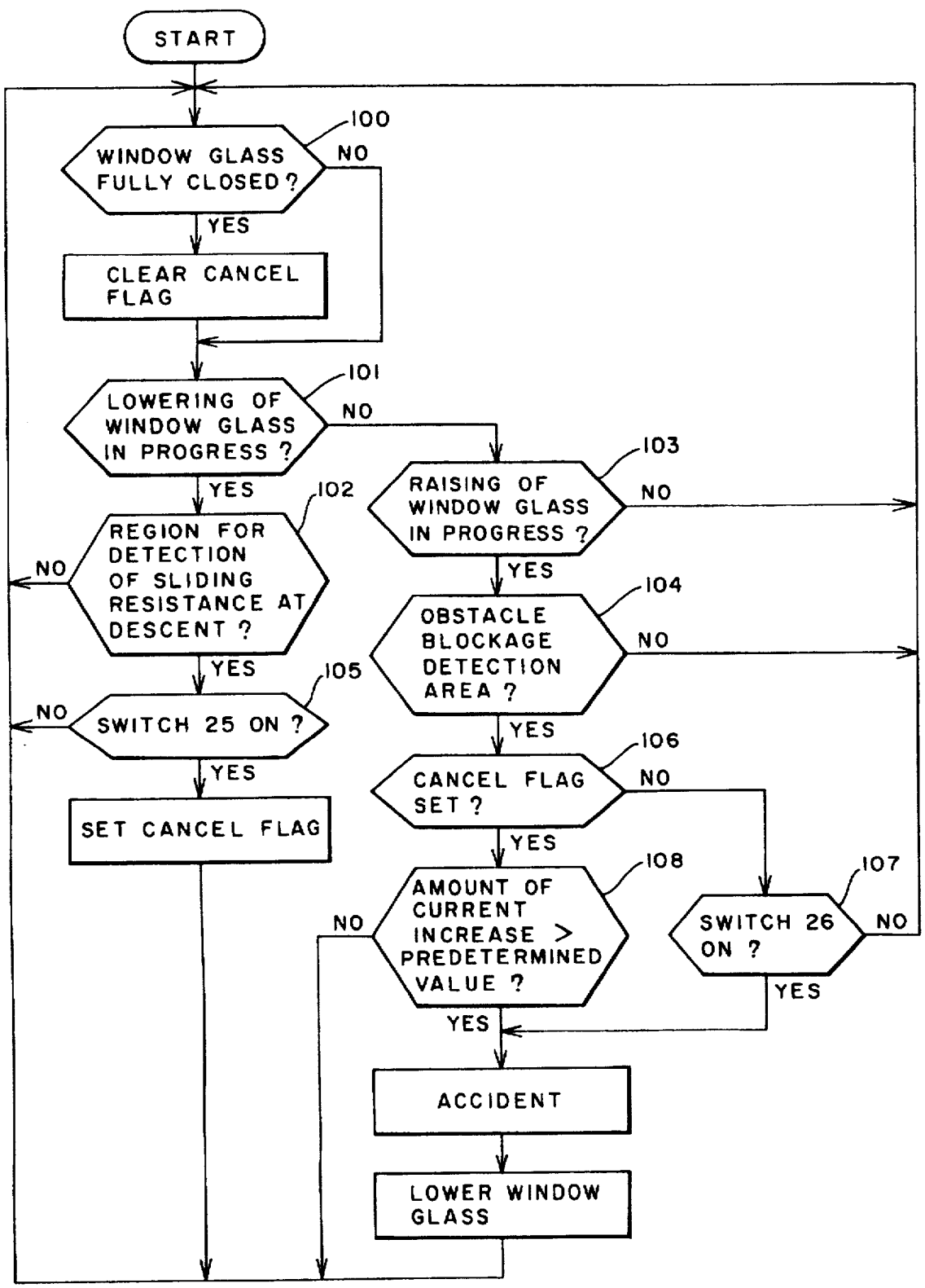
FIG. 5 is a flowchart illustrating an operation for detecting that an object has been caught in a closing power window.

It is determined at step 100 in FIG. 5 whether the window glass is fully closed or not. When the window is found to be fully closed, a cancel flag is cleared and the program advances to step 101. If the window is found not to be fully closed, the program proceeds directly to step 101 without the cancel flag being cleared. It is determined at step 101 whether the window glass is being lowered or not. If it is found that the window glass is being lowered, the program proceeds to step 102, at which it is determined whether the window glass is in the region where sliding resistance is detected at descent of the window, as described in connection with FIG. 6.

If it is found at step 102 that the window glass is not in the region where sliding resistance is detected at descent of the window, the program returns to step 100. However, if the window glass is found to be in this region, then the program proceeds to step 105, at which it is determined whether the first switch 25 is ON (closed) or OFF (open). If it is determined that the first switch 25 is OFF, the program returns to step 100.

If it is found at step 101 that the window glass is not being lowered, then the program proceeds to step 103, at which it is determined whether the window glass is being raised, and thence to step 104, at which it is determined whether the window glass is in the region for detecting obstacle blockage of the window.

If it is found that the window glass is being raised at step 103, the program proceeds to step 104, but in the case of the window glass being lowered the program returns to step 100. At step 104 it is determined whether the window glass is in the region for detecting obstacle blockage thereof. In the case of the obstacle blockage detecting area, step 104 proceeds to step 106 and in the case of none obstacle blockage detecting area, step 104 returns to step 100.

If it is determined at step 104 that the window glass is situated in the obstacle blockage detection region, it is determined at next step 106 whether a cancel flag is set. In the case that the cancel flag has been set, a control by an electrical current is done at step 108 and in the case that the cancel flag is not set, the program proceeds to step 107. Step 107 calls for a determination as to whether the second switch 26 is ON (closed) or OFF (open). If the second switch 26 is ON, then it is judged that an object is obstructing the window glass and processing for lowering the window glass is executed. If the second switch 26 is found to be OFF, however, the program returns to step 100.

If it is determined at step 105 that the first switch 25 is ON, then the cancel flag is set. If, under these conditions, the window glass in the process of being lowered starts being raised and the program proceeds to step 106, it is determined whether the cancel flag has been set. If the answer is "Y", then the program proceeds to step 108. Here it is judged whether the amount of increase in current to the electric motor 1 has exceeded a fixed value (I). If it is found at step 108 that the increase in current to the electric motor 1 has exceeded the fixed value (I), then it is judged that an object has become caught by the window glass and processing for lowering the window glass is executed. If the increase in current to the electric motor 1 has not exceeded the fixed value (I), however, the program returns to step 100.

According to the flowchart of FIG. 5, the program returns to step 100 if the second switch 26 is found to be OFF at step 107. However, an arrangement may be adopted in which, after step 108 is executed, the program returns to step 100 or processing for lowering the window glass is executed following detection of obstacle blockage of the window, after which the program returns to step 100.

As many apparently widely different embodiments of the present invention can be made without departing from the spirit and scope thereof, it is to be understood that the invention is not limited to the specific embodiments thereof except as defined in the appended claims.

What is claimed is:

1. A power window regulator apparatus comprising:
   a worm rotated by an electric motor;
   a driving element having a worm wheel for meshing with said worm;
   a driven element connected to said driving element via a displaceable ring spring;
   an output shaft connected to said driven element;
   a printed circuit board synchronized to said output shaft and provided with a first switch having first and second states, said first switch switching from its first to second state when displacement of the ring spring exceeds a predetermined amount during descent of a window glass, and a second switch having first and second states, said second switch switching from its first to second state when displacement of the ring spring exceeds a predetermined amount during ascent of the window glass, and
   a controller for receiving a signal from said first switch when it is switched to its second state in response to an increase in resistance during descent of the window glass causing the ring spring to exceed the predetermined amount, and reversing the direction of the window glass from ascent to descent following switching of said first switch to its second state during descent and the occurrence during ascent of current increase to the electric motor greater than a predetermined value.

2. The apparatus according to claim 1, wherein an open portion is provided between said first and second switches.

3. The apparatus according to claim 1, wherein said driving element is provided with a shoe of an electrical conductive material.

4. The apparatus according to claim 1, wherein said driving element is provided with a shoe of an electrical conductive material and said displacement of the ring spring detects a position of said driven element with respect to said driving element and a slidable resistance of the window glass.

5. The apparatus according to claim 1, wherein reversing the direction of said window glass is conducted based on the amount of current increase to be supplied to the electric motor when said ring spring is displaced beyond the predetermined amount during the descent of the window glass.

6. The apparatus according to claim 1, wherein the first switch has a pair of spaced, arcuate printed circuits and the second switch has a separate pair of spaced, arcuate printed circuits that are circumferentially spaced from the pair of the first switch.

7. A power window regulator comprising:
   a power unit for movement of a window glass of a vehicle in an ascending and descending direction; and
   controller means for commanding said power unit for movement of the window glass, said controller having;
   movement decision means for judging the direction of movement of the window glass;
   position decision means for judging whether the window glass is situated in a region in which obstacle blockage of the window glass is detected during movement in the ascending direction and in a region in which sliding resistance is detected during movement of the window glass in the descending direction;
   resistance decision means for detecting resistance during descent and ascent of the glass; and
   current detection means for detecting an amount of current increase to said power unit in dependence upon a signal from said resistance decision means.

8. The apparatus according to claim 7, wherein said controller means forgoes processing of an input signal from said resistance decision means when the window glass is situated outside of the region in which obstacle blockage is detected.

9. The apparatus according to claim 8, wherein said current detection means detects obstacle blockage during ascent of the window glass in dependence upon sliding resistance during descent of the window glass, said window glass being lowered when the obstacle blockage is detected.

10. The apparatus according to claim 9, wherein said power unit includes:

a worm rotated by an electric motor;

a driving element having a worm wheel for meshing with said worm;

a driven element connected to said driving element via a displaceable ring spring;

an output shaft connected to said driven element; and a printed circuit board synchronized to said output shaft and provided with a first switch having first and second states, said first switch switching from its first to second state when displacement of the ring spring exceeds a predetermined amount during descent of the window glass, and a second switch having first and second states, said second switch switching from its first to second state when displacement of the ring spring exceeds a predetermined amount during ascent of the window glass.

11. The apparatus according to claim 10, wherein the first switch has a pair of spaced, arcuate printed circuits and the second switch has a separate pair of spaced, arcuate printed circuits that are circumferentially spaced from the pair of the first switch.

12. A power window regulator apparatus comprising:

a worm rotated by an electric motor;

a driving element having a worm wheel for meshing with said worm;

a driven element connected to said driving element via a displaceable ring spring;

an output shaft connected to said driven element;

a printed circuit board synchronized to said output shaft and provided with a first switch having first and second states, said first switch switching from its first to second state when displacement of the ring spring exceeds a predetermined amount during descent of a window glass, and a second switch having first and second states, said second switch switching from its first to second state when displacement of the ring spring exceeds a predetermined amount during ascent of the window glass, and a controller for receiving a signal from said second switch, in response to displacement of the ring spring exceeding a predetermined amount during ascent of the window glass, and reversing the direction of the window glass.

* * * * *